(12) United States Patent
Yamashita et al.

(10) Patent No.: US 12,534,646 B2
(45) Date of Patent: Jan. 27, 2026

(54) FELT-BASED FOUR-SIDE-PROCESSING AND METHOD FOR PRODUCING SAID PROCESSING MATERIAL

(71) Applicant: YOSHINO GYPSUM CO., LTD., Tokyo (JP)

(72) Inventors: Takuji Yamashita, Tokyo (JP); Yusuke Watanabe, Tokyo (JP); Shun Tsukamoto, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 103 days.

(21) Appl. No.: 18/570,523

(22) PCT Filed: Jun. 23, 2022

(86) PCT No.: PCT/JP2022/025098
§ 371 (c)(1),
(2) Date: Dec. 14, 2023

(87) PCT Pub. No.: WO2023/282076
PCT Pub. Date: Jan. 12, 2023

(65) Prior Publication Data
US 2024/0271011 A1 Aug. 15, 2024

(30) Foreign Application Priority Data
Jul. 7, 2021 (JP) .................. 2021-112631

(51) Int. Cl.
*C09J 7/29* (2018.01)

(52) U.S. Cl.
CPC ........... *C09J 7/29* (2018.01); *C09J 2203/346* (2020.08); *C09J 2301/122* (2020.08);
(Continued)

(58) Field of Classification Search
CPC .. C09J 7/29; C09J 2203/346; C09J 2301/122; C09J 2301/204; C09J 2301/302;
(Continued)

(56) References Cited

U.S. PATENT DOCUMENTS

| 4,606,957 A | 8/1986 | Cohen | |
|---|---|---|---|
| 2016/0198790 A1* | 7/2016 | Ishmael | ................ A41D 13/06 2/239 |
| 2021/0040735 A1 | 2/2021 | Hasegawa et al. | |

FOREIGN PATENT DOCUMENTS

| JP | 05-066039 | 8/1993 |
|---|---|---|
| JP | H05-230895 A | 9/1993 |

(Continued)

OTHER PUBLICATIONS

Machine translation of JP H08345 Y2. (Year: 1992).*
(Continued)

*Primary Examiner* — Patricia L. Nordmeyer
(74) *Attorney, Agent, or Firm* — HSML P.C.

(57) ABSTRACT

A felt-based four-sides-processing material having a release paper-attached pressure-sensitive adhesive layer is provided. The felt-based four-sides-processing material has a continuous or non-continuous pressure-sensitive adhesive region on any of flat surfaces of a base material in a longitudinal direction of the flat surface and release paper pasted to the pressure-sensitive adhesive layer, where a width of the pressure-sensitive adhesive layer is narrower than a width of a short side of the base material, and a non-pressure-sensitive adhesive region where a pressure-sensitive adhesive is not present is provided along at least one edge in the longitudinal direction of the base material entirely or partially, and the release paper has the same size as that of the flat surface of the base material.

8 Claims, 7 Drawing Sheets

(52) U.S. Cl.
CPC .... *C09J 2301/204* (2020.08); *C09J 2301/302* (2020.08); *C09J 2400/10* (2013.01)

(58) Field of Classification Search
CPC ............ C09J 2400/10; C09J 2301/1242; C09J 2400/123; C09J 2400/263; C09J 7/21; C09J 7/38; C09K 21/02; E04B 1/90; E04B 1/942; E04C 2/10
See application file for complete search history.

(56) References Cited

FOREIGN PATENT DOCUMENTS

| JP | H08-000345 Y2 | 1/1996 |
|---|---|---|
| JP | H08-209080 A | 8/1996 |
| JP | H11-269441 A | 10/1999 |
| JP | 2014-057725 A | 4/2014 |
| JP | 2021-187048 A | 12/2021 |
| WO | 2019/172040 A1 | 9/2019 |

OTHER PUBLICATIONS

Machine translation of JP H11269441 A. (Year: 1998).*
Korean Office Action, issued in the corresponding Korean patent application No. 10-2024-7002354, dated Mar. 17, 2025, 12 pages with the machine translation.
International Search Report, issued in the corresponding PCT application No. PCT/JP2022/025098, mailed Aug. 9, 2022, 5 pages (including translation).
Extended European Search Report, issued in the corresponding European patent application No. 22837493.0, dated May 23, 2025, 9 pages.
International Preliminary Report on Patentability, issued in the corresponding PCT application No. PCT/JP2022/025098, dated Dec. 14, 2023, 6 pages (translation enclosed).

* cited by examiner

[Figure 1]
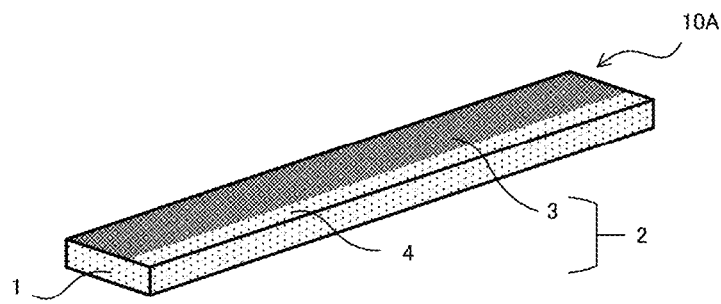
[Figure 2(A)]
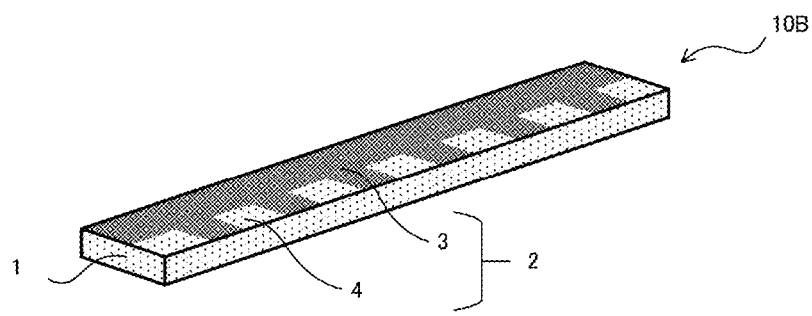
[Figure 2(B)]
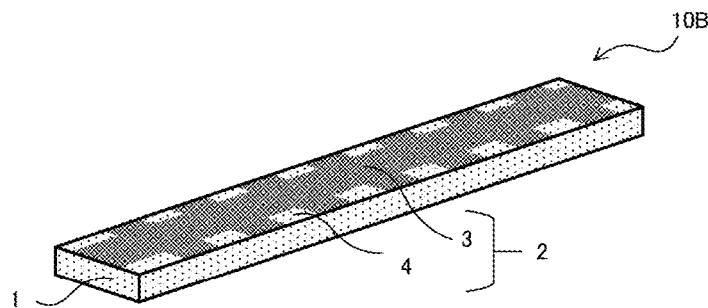

[Figure 2(C)]
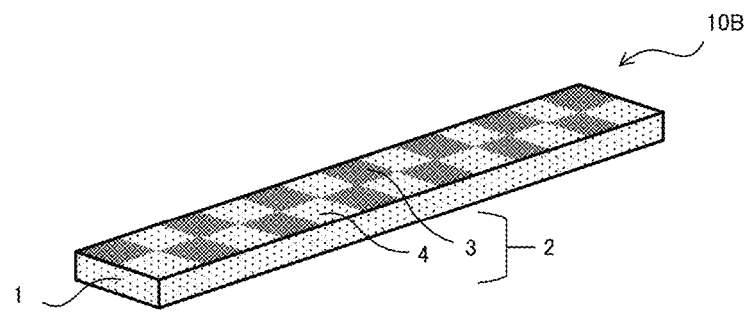
[Figure 3(A)]
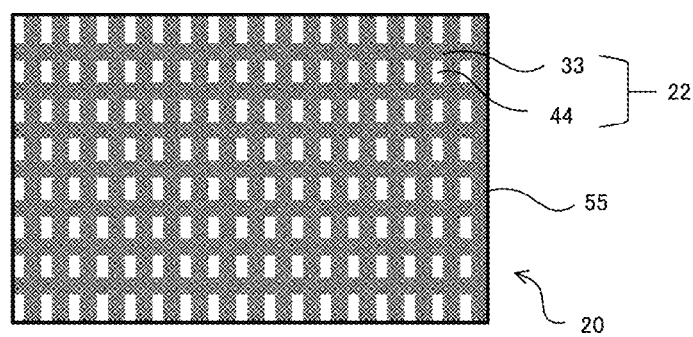
[Figure 3(B)]
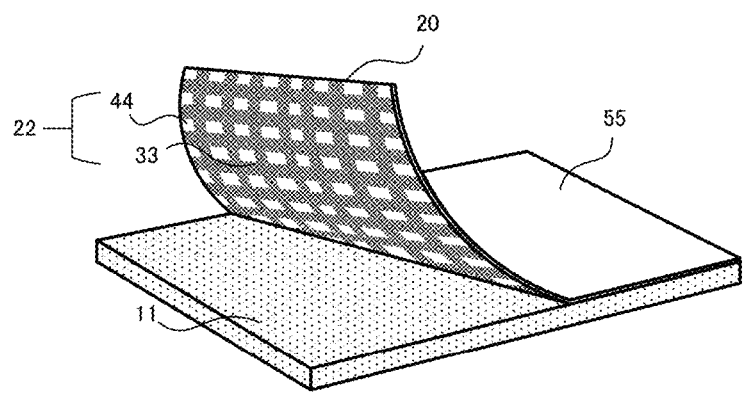

[Figure 3(C)]
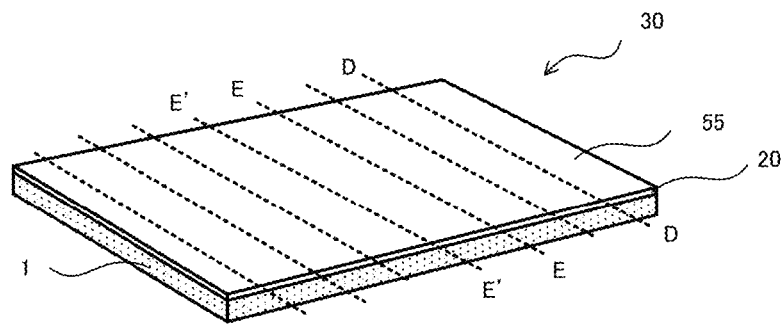
[Figure 3(D)]
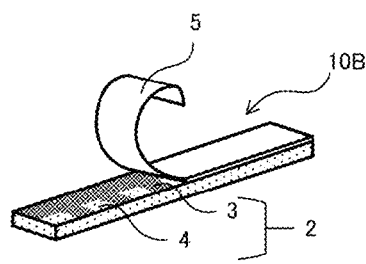
[Figure 3(E)]
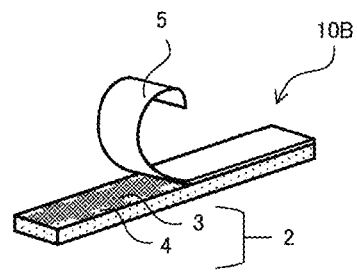

[Figure 4(A)]
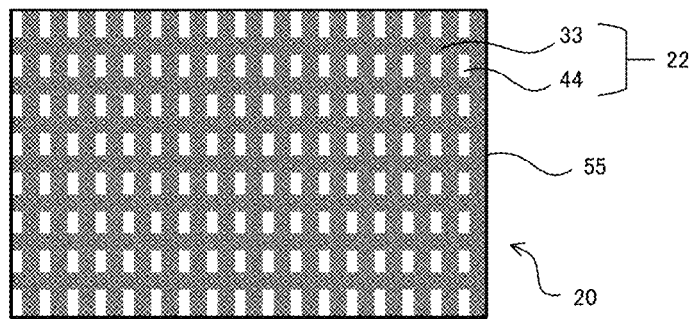
[Figure 4(B)]
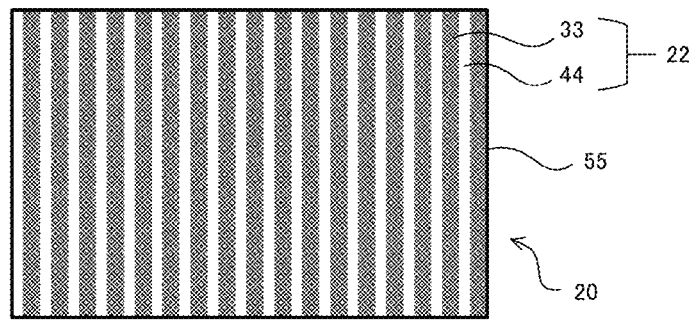
[Figure 4(C)]
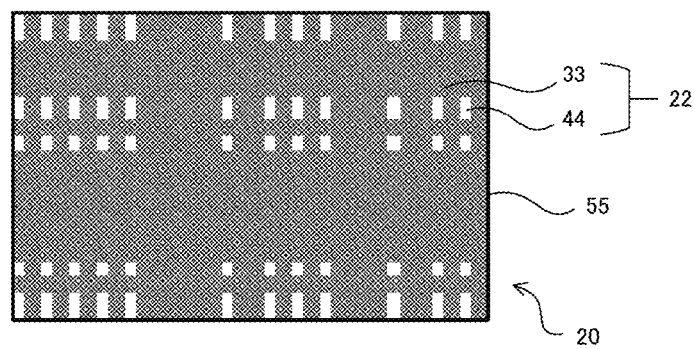

[Figure 5(A)]
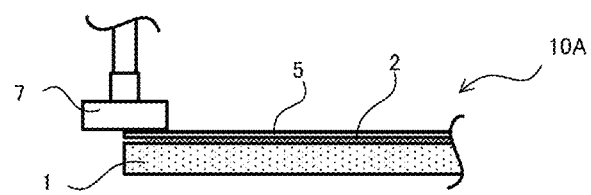
[Figure 5(B)]
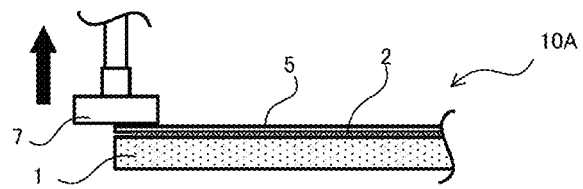
[Figure 5(C)]
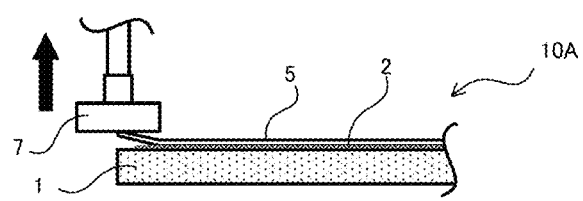

[Figure 5(D)]
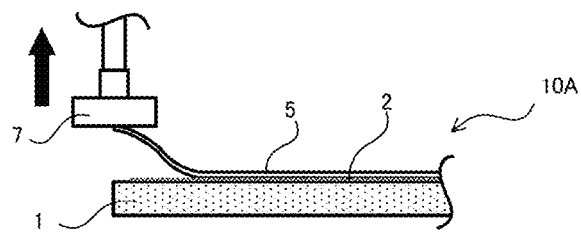
[Figure 6(A)]
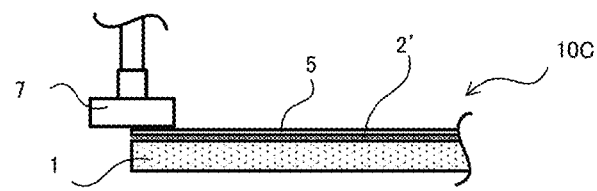
[Figure 6(B)]
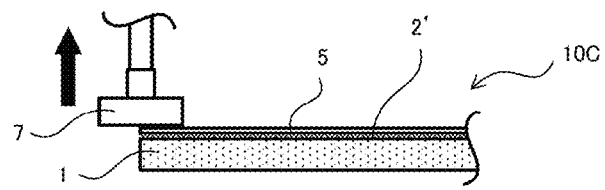
[Figure 6(C)]
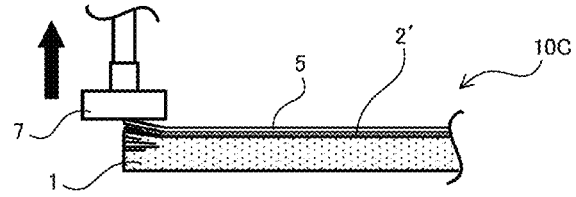

[Figure 7(A)]
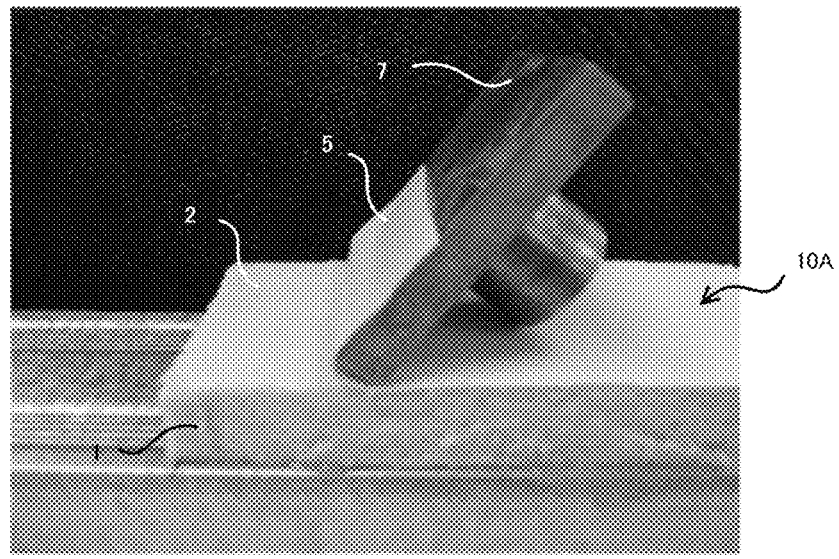
[Figure 7(B)]
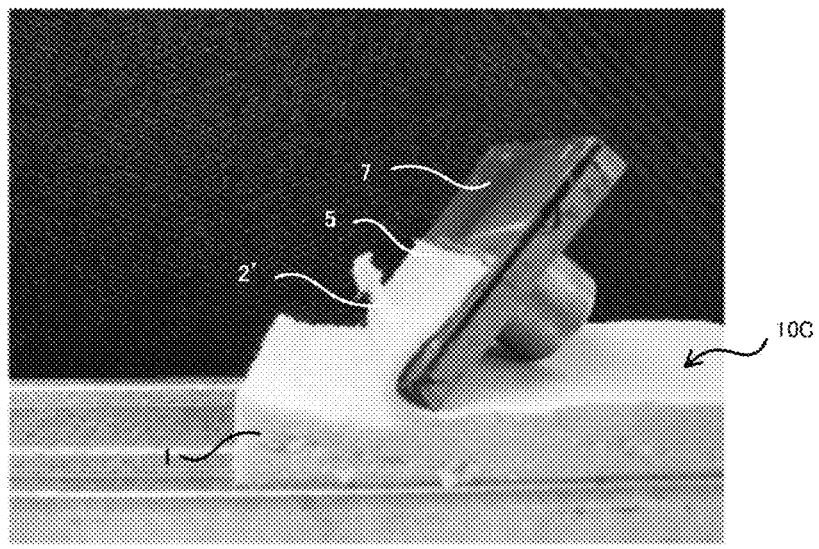

FELT-BASED FOUR-SIDE-PROCESSING AND METHOD FOR PRODUCING SAID PROCESSING MATERIAL

TECHNICAL FIELD

The present invention relates to a felt-based four-sides-processing material having a pressure-sensitive adhesive layer and a method for producing the processing material. In detail, the present invention relates to a technique that provides a felt-based four-sides-processing material of high practical value, the technique being such that: with regard to processing materials composed of a flame-retardant, felt-like material as a base material, which are used for filling gaps between peripheral connecting parts (top/bottom and right/left ends) in order to ensure fire resistance and sound insulation when performing dry construction or the like of a fireproofing and/or sound-insulating wall, convenience of work of releasing release paper to expose a pressure-sensitive adhesive layer, which is performed in filling processing work, is particularly enhanced; occurrence of damage of a felt-based four-sides-processing material, which may occur in releasing the release paper, is reduced; and a processing material can be used with high yield.

BACKGROUND ART

As one of felt-based four-sides-processing materials which are currently distributed on the market and widely used, there is one, for example, having a configuration such that a flame-retardant/fire-resistant felt-like material, such as, for example, a long, rectangular column made of rock wool, is used as a base material (core material), a pressure-sensitive adhesive layer is formed on the whole surface of any of surfaces of the base material, and further, and release paper is pasted to a surface of the pressure-sensitive adhesive layer. According to the above-described felt-based four-sides-processing material having a pressure-sensitive adhesive layer provided thereon, the processing material can quickly be fixed to a surface which forms a gap and is composed of RC, H-steel, or the like, and therefore working of four sides processing can easily be done and the four-sides-processing material can be held stably to a desired position after construction. The release paper pasted to the pressure-sensitive adhesive layer is provided for the purpose of protecting the pressure-sensitive adhesive surface of the pressure-sensitive adhesive layer before construction so that the function of the pressure-sensitive adhesive layer will not be impaired, and therefore the release paper and the pressure-sensitive adhesive surface before construction are tightly integrated. Then, when four sides processing is performed, this release paper is released to expose the pressure-sensitive adhesive layer, and the surface of the felt-based four-sides-processing material where the pressure-sensitive adhesive layer is provided is pasted and fixed to a desired position of RC, H-steel, or the like which is a face to be constructed, and in this manner, working of filling gaps with a felt-based four-sides-processing material is performed.

Felt-based four-sides-processing materials which are being widely distributed on the market generally have a configuration described below. In the felt-based four-sides-processing materials, a pressure-sensitive adhesive layer is provided over the whole surface on any of surfaces of a base material, and release paper is pasted and laminated to the whole surface of the pressure-sensitive adhesive layer. The base material surface where the pressure-sensitive adhesive layer is provided, the pressure-sensitive adhesive layer, and the release paper have the same size, and the base material surface and the release layer are tightly integrated by the pressure-sensitive adhesive layer. A pressure-sensitive adhesive layer-attached, felt-based four-sides-processing material having the above-described configuration is produced in the manner as described below. Firstly, a wide, plate-shaped base material for production made of rock wool is used; a pressure-sensitive adhesive layer is formed on the whole surface of one of the wide, flat surfaces of the plate-shaped base material for production; and a laminate for production having a configuration such that release paper is pasted to the outermost surface of the pressure-sensitive adhesive layer is obtained. On that occasion, by pasting one pressure-sensitive adhesive surface of a so-called double-sided tape to the base material for production, the pressure-sensitive adhesive layer is formed on the whole flat surface of the wide base material for production, and at the same time, the laminate having a structure such that the release paper is provided on the outermost surface of the pressure-sensitive adhesive layer is obtained. Thereafter, the laminate for production is cut in parallel along the long side of the laminate for production into a width of about 5 mm to about 10 cm to obtain a plurality of long, rectangular column-shaped, felt-based four-sides-processing materials each having a desired width.

Among the long, felt-based four-sides-processing materials produced in the manner as described above and having a structure such that the pressure-sensitive adhesive layer is formed on the whole flat surface and the release paper having the same size as the pressure-sensitive adhesive surface is laminated on the pressure-sensitive adhesive surface, there are some products in which a short paper (inserting paper) is sandwiched between the surface of the pressure-sensitive adhesive layer and the release paper at one end part along the short side direction as a product devised so that the release paper can easily be released. According to these products, in releasing the release paper, which is tightly integrated with the pressure-sensitive adhesive surface of the base material (core material), which is performed during working of four sides processing, the release paper can easily be released making use of this inserting paper.

SUMMARY OF INVENTION

Technical Problem

The present inventors have found that a felt-based four-sides-processing material having the above-described conventional configuration has problems as described below when four sides processing is performed therewith. As described above, when four sides processing is performed, the pressure-sensitive adhesive layer provided on the base material (core material) first needs to be pasted to a construction face to fix the four-sides-processing material. On that occasion, working of releasing the release paper pasted to the outermost surface of the pressure-sensitive adhesive layer needs to be done for the purpose of exposing the pressure-sensitive adhesive layer. As for four sides processing, only when a series of working of releasing the release paper, and then pasting the exposed pressure-sensitive adhesive layer surface to a desired position of RC, H-steel, or the like is smoothly performed, it is possible to smoothly perform working of four sides processing in which gaps between peripheral connecting parts are filled. Therefore, not only a function of improving workability by temporarily fixing the felt-based four-sides-processing material, which needs to be done for positioning that is performed in construction, but also a function of making it possible to sustainably fix the felt-based four-sides-processing material to a desired position of RC, H-steel, or the like after the construction are required for the pressure-sensitive adhesive layer. For this reason, in the felt-based four-sides-processing material, the pressure-sensitive adhesive layer is strongly bonded to the surface of the base material (core material).

Under these circumstances, the flame-retardant, felt-like material that forms the base material (core material) of the four-sides-processing material is, for example, a laminate obtained by laminating felt-like rock wool in the thickness direction and therefore has a characteristic that it is easy to peel into layers. The present inventors have found that when working of releasing the release paper using a conventional felt-based four-sides-processing material made of rock wool, there is a problem described below. As described above, the release paper and the pressure-sensitive adhesive surface of the pressure-sensitive adhesive layer are tightly integrated, and therefore there has been a problem that a worker cannot release the release paper from the surface of the pressure-sensitive adhesive layer quickly, which impairs workability. In addition to this problem, even when a worker cautiously releases the release paper from the surface of the pressure-sensitive adhesive layer, some parts on the pressure-sensitive adhesive layer side of the rock wool which is a laminate may be peeled into layers together with the release paper and the pressure-sensitive adhesive layer, which also causes breakage of the four-sides-processing material, and this is partly due to the above-described characteristic of the felt-like material.

Then, when the felt-like material is in a state of being peeled into layers, favorable separation of the pressure-sensitive adhesive layer and the release paper is no longer possible because the felt-like material is soft, and as a result, utilization as a four-sides-processing material is impossible. This means that the four-sides-processing material cannot be utilized efficiently and building materials are wasted. To suppress the occurrence of such a situation, a worker needs to conduct working of releasing the release paper pasted to the pressure-sensitive adhesive layer more cautiously and carefully, which has been found to be a cause of lowering the working efficiency.

That is, according to studies conducted by the present inventors, a felt-based four-sides-processing material has the following major technical problems that cause lowering of working efficiency in performing construction work and, in some cases, cause waste of building materials. Firstly, with regard to a conventional felt-based four-sides-processing material, the size of the release paper pasted to the pressure-sensitive adhesive layer is the same as the size of the pressure-sensitive adhesive layer, in addition, the release paper for protecting the pressure-sensitive adhesive surface is tightly integrated with the pressure-sensitive adhesive layer, and further, the felt-like material as a base material is soft and easily peeled, which are described above, and therefore there is a problem that it is not easy for a worker to release the release paper from the pressure-sensitive adhesive layer quickly and favorably at the end part of the four-sides-processing material. Further, there is a problem that once the base material made of a felt-like material that is soft and easily peeled is peeled together with the release paper and the pressure-sensitive adhesive layer, the felt-like four-sides-processing material turns into a defective product. On the other hand, as described above, there are products in which the inserting paper is provided between the pressure-sensitive adhesive surface and the release paper at one end part along the short side direction among the conventional felt-based four-sides-processing materials, and by using such products, it is remarkably easier to release the release paper as compared to a product in which the inserting paper is not provided.

However, with regard to such products, a step of providing the inserting paper is newly needed in the production steps for the felt-based four-sides-processing material, and therefore there is a problem that an increase in production costs is brought about. In addition, the inserting paper is disposed of together with the release paper after four sides processing, and therefore there is also a problem that the amount of waste after construction increases by providing the inserting paper. Further, even when the configuration such that the inserting paper is provided is adopted like the conventional products, there are a great variety of embodiments of construction for the felt-based four-sides-processing materials, which will be described below, and due to this, the difficulty in releasing the release paper from the surface of the pressure-sensitive adhesive layer, which occurs during working of four sides processing, cannot necessarily be solved by providing the inserting paper at the end part of the processing materials.

According to studies conducted by the present inventors, the felt-based four-sides-processing materials being distributed on the market basically have a long, rectangular column (plate) shape and various widths, and can appropriately be selected according to gaps to be objects of processing. On the other hand, the lengths thereof are constant, that is, for example, about 1 m to about 2 m in view of production efficiency, storage properties, transportation properties, and versatility. In contrast, the shapes of gaps that need to be filled with felt-based four-sides-processing materials in order to enhance fire resistant and sound insulation are various. To fill such various gaps favorably, there has been a need to cut the felt-based four-sides-processing materials standardized to a certain length to adjust the lengths thereof most suitably in addition to select products each having the optimum width. In some cases, the size needs to be adjusted so that a felt-based four-sides-processing material will have the optimum width. Therefore, workers use felt-based four-sides-processing materials by cutting them into shapes suitable for filling the gaps to be processed at four-sides-processing sites. Particularly, since the lengths of the felt-based four-sides-processing materials are standardized, cutting for adjusting length is often performed for use. When the felt-based four-sides-processing materials are cut, most of the resultant felt-based four-sides-processing materials for filling the gaps, which are to be actually used, are turned into ones in a state where the inserting paper is not provided, even if the felt-based four-sides-processing materials are the above-described products each having a configuration such that the inserting paper is provided at one end along the short side direction. Therefore, the effect of easily releasing the release paper, which is obtained by providing the inserting paper, cannot be obtained any longer.

Further, according to studies conducted by the present inventors, the end part of the felt-based four-sides-processing material which was cut turns into the following state by being press-cut during cutting. Firstly, (a) the release paper and the pressure-sensitive adhesive layer are integrated more tightly, which makes it more difficult to release the release paper than before cutting. In addition, (b) when the felt-like base material is a laminate of rock wool obtained by laminating rock wool in the thickness direction, the laminate is considered to be susceptible to damage between the layers, and therefore it becomes even more difficult to release the release paper from the pressure-sensitive adhesive layer quickly than before cutting. Further, (c) due to the fact that the rock wool material used as the base material (core material) has a characteristic that it is easily peeled into layers, it becomes more difficult to release the release paper favorably.

Accordingly, an object of the present invention is to provide a felt-based four-sides-processing material such that a worker can release the release paper from the pressure-sensitive adhesive layer quickly and favorably in any of the above-described cases. Another object of the present invention is to provide the above-described felt-based four-sides-processing material of excellent quality, thereby providing a technique making it possible to enhance the workability of four sides processing performed by a worker, and at the same time, to enable the four sides processing excellent in economic efficiency, which can suppress the occurrence of a situation in which building materials are wasted and an increase in wastes, which have occurred in the conventional four sides processing.

Solution to Problem

The above-described objects are achieved by the present invention described below. Specifically, the present invention provides a felt-based four-sides-processing material having a configuration described below as the "first invention."

[1] A felt-based four-sides-processing material having a release paper-attached pressure-sensitive adhesive layer, the felt-based four-sides-processing material comprising: a rectangular column-shaped base material comprising a flame-retardant, felt-like material; a pressure-sensitive adhesive layer having a continuous pressure-sensitive adhesive region provided on any of flat surfaces of the base material in a longitudinal direction of the flat surface; and release paper pasted to the pressure-sensitive adhesive layer, wherein the base material is a laminate obtained by laminating felt-like rock wool in a thickness direction, the laminate having a thickness of 3 mm to 50 mm and a width of 5 mm to 10 cm and having a long, rectangular column shape; the pressure-sensitive adhesive layer has a configuration such that the continuous pressure-sensitive adhesive region having a pressure-sensitive adhesive is provided on the flat surface of the base material where the pressure-sensitive adhesive layer is provided in a width narrower than a width of a short side of the base material, and a non-pressure-sensitive adhesive region where the pressure-sensitive adhesive is not present is provided along the whole of at least one edge in the longitudinal direction; and the release paper has the same size as the flat surface of the base material.

The above-described objects are achieved by the present invention described below. Specifically, the present invention provides a felt-based four-sides-processing material having a configuration described below as the "second invention."

[2] A felt-based four-sides-processing material having a release paper-attached pressure-sensitive adhesive layer, the felt-based four-sides-processing material comprising: a rectangular column-shaped base material comprising a flame-retardant, felt-like material; a pressure-sensitive adhesive layer having a pressure-sensitive adhesive region provided continuously or discontinuously on any of flat surfaces of the base material in a longitudinal direction of the flat surface; and release paper pasted to the pressure-sensitive adhesive layer, wherein the base material is a laminate obtained by laminating felt-like rock wool in a thickness direction, the laminate having a thickness of 3 mm to 50 mm and a width of 5 mm to 10 cm and having a long, rectangular column shape; the pressure-sensitive adhesive layer has a configuration such that on the flat surface of the base material where the pressure-sensitive adhesive layer is provided, the pressure-sensitive adhesive region having a pressure-sensitive adhesive and a non-pressure-sensitive adhesive region where the pressure-sensitive adhesive is not present are alternately formed along at least one edge in a longitudinal direction of the flat surface, and a non-pressure-sensitive adhesive region where the pressure-sensitive adhesive is not present is provided, in at least one edge part in a short side direction of the base material, at a part including at least one end part of the edge; and the release paper has the same size as the flat surface of the base material.

Preferred embodiments of the felt-based four-sides-processing materials described above include the followings.

[3] The felt-based four-sides-processing material according to [1] or [2], wherein the pressure-sensitive adhesive layer has a structure such that pressure-sensitive adhesive layers are formed on both sides of a film support, and at least the pressure-sensitive adhesive layer on the side where the release paper is pasted has a configuration having the non-pressure-sensitive adhesive region where the pressure-sensitive adhesive is not present along at least one edge in the longitudinal direction of the base material or has a configuration alternately having the pressure-sensitive adhesive region having the pressure-sensitive adhesive and the non-pressure-sensitive adhesive region where the pressure-sensitive adhesive is not present along at least one edge in the longitudinal direction of the base material. [4] The felt-based four-sides-processing material according to [1] or [2], wherein in the pressure-sensitive adhesive layer, the pressure-sensitive adhesive region has a total area of 25% to 99% when the total area of the flat surface of the base material where the pressure-sensitive adhesive layer is provided is assumed to be 100%.

Note that with regard to the above-described objects, some of the effects obtained by the present invention can also be achieved by the following invention according to studies conducted by the present inventors.

A felt-based four-sides-processing material comprising: a rectangular column-shaped base material comprising a flame-retardant, felt-like material; a pressure-sensitive adhesive layer provided on any one of surfaces of the base material; and release paper pasted to the pressure-sensitive adhesive layer, wherein the base material is a laminate obtained by laminating felt-like rock wool in a thickness direction, the laminate having a thickness of 3 mm to 50 mm and a width of 5 mm to 10 cm and having a long, rectangular column shape; the pressure-sensitive adhesive layer is provided on the whole surface of the surface of the base material where the pressure-sensitive adhesive layer is provided; and the release paper pasted to the pressure-sensitive adhesive layer has a width 0.1 mm or larger than the width of the surface of the base material where the pressure-sensitive adhesive layer is provided.

However, when the width of the release paper is larger than the width of the surface of the base material just as described above, the production steps for a four-sides-processing material are complicated due to the release paper for forming the extra part, and therefore such a method is not so preferable because the method is inferior in production efficiency and increases the amount of release paper to be wasted at the time of use.

The present invention provides, as another embodiment, a method for producing a felt-based four-sides-processing material, described below.

[5] A method for producing a felt-based four-sides-processing material, the method being a production method for obtaining the felt-based four-sides-processing material according to any one of [1] to [4] and comprising: a lamination step of laminating a pressure-sensitive adhesive layer-forming member for production and for forming a pressure-sensitive adhesive layer having a configuration such that laminated release paper is released to expose a pressure-sensitive adhesive surface for use on any of flat surfaces of a base material for production made of rock wool, the base material being a laminate obtained by laminating felt-like rock wool in a thickness direction, the laminate having a thickness of 3 mm to 50 mm and being such that a flat surface shape is a square or rectangle in which each length of two sides is independently 50 cm or longer, thereby obtaining a laminate; and a cutting step of cutting the laminate obtained in the lamination step in the longitudinal direction, thereby obtaining a long, rectangular column-shaped, felt-based four-sides-processing material having a width adjusted to 5 mm to 10 cm, wherein as the pressure-sensitive adhesive layer-forming member, one whose flat surface shape is the same as the shape of the flat surface of the base material for production on which the pressure-sensitive adhesive layer is to be provided, the one providing a configuration of either (A) or (B) below, is used:

(A) the shape of the release paper-attached pressure-sensitive adhesive layer after being cut in the cutting step is such that a non-pressure-sensitive adhesive region where a pressure-sensitive adhesive is not present is formed along at least one edge in a longitudinal direction of the base material made of rock wool; or (B) the shape of the release paper-attached pressure-sensitive adhesive layer after being cut in the cutting step is such that a pressure-sensitive adhesive region having a pressure-sensitive adhesive and a non-pressure-sensitive adhesive region where the pressure-sensitive adhesive is not present are alternately formed along at least one edge in a longitudinal direction of the base material made of rock wool; and a non-pressure-sensitive adhesive region where the pressure-sensitive adhesive is not present is formed in at least one edge part in a short side direction of the base material for production at a part including at least one end part of the edge.

Advantageous Effects of Invention

According to the present invention, there is provided a felt-based four-sides-processing material such that when a worker who performs four sides processing cuts, for use, the felt-based four-sides-processing material having a release paper-attached pressure-sensitive adhesive layer into an appropriate size so as to fit into an installation position, the worker can release the release paper from the pressure-sensitive adhesive layer quickly and favorably. In addition, according to the present invention, the workability of four sides processing that a worker performs can be enhanced by providing the above-described felt-based four-sides-processing material of excellent quality. Further, according to the present invention, as well as the enhancement of workability, suppression of occurrence of a situation in which building materials are wasted caused by breakage of a base material (core material), which has occurred in the conventional four sides processing, and suppression of the problem of an increase in production steps and an increase in the amount of waste caused by using inserting paper, can be achieved. As a result, according to the present invention, there is provided an excellent technique that enables four side processing excellent in workability, environmental protection, and economic efficiency.

BRIEF DESCRIPTION OF DRAWINGS

FIG. 1 is a perspective view for schematically describing one example of a felt-based four-sides-processing material of the first invention, and in the perspective view, release paper is not shown.

FIG. 2(A) is a perspective view for schematically describing one example of a felt-based four-sides-processing material of the second invention, and in the perspective view, release paper is not shown.

FIG. 2(B) is a perspective view for schematically describing another example of the felt-based four-sides-processing material of the second invention, and in the perspective view, release paper is not shown.

FIG. 2(C) is a perspective view for schematically describing still another example of the felt-based four-sides-processing material of the second invention, and in the perspective view, release paper is not shown.

FIG. 3(A) is a schematic diagram for describing a series of steps in a method for producing a felt-based four-sides-processing material of the present invention and is a schematic diagram of one example of a pressure-sensitive adhesive layer-forming member 20 to be used for production.

FIG. 3(B) is a schematic diagram for describing a series of steps in the method for producing a felt-based four-sides-processing material of the present invention and is a schematic perspective view for describing a lamination step of pasting and laminating the pressure-sensitive adhesive layer-forming member 20 on one flat surface of a base material 11 for production, thereby obtaining a laminate 30 (see, FIG. 3(C), described later).

FIG. 3(C) is a schematic diagram for describing a series of steps in the method for producing a felt-based four-sides-processing material of the present invention and is a schematic perspective view for describing a cutting step of cutting the laminate 30, obtained by laminating the pressure-sensitive adhesive layer-forming member 20 on the base material 11 for production, into desired widths.

FIG. 3(D) is a schematic diagram for describing a series of steps in the method for producing a felt-based four-sides-processing material of the present invention and is a schematic perspective view illustrating one example of felt-based four-sides-processing material products of the second invention, the products obtained by cutting the laminate 30 illustrated in FIG. 3(C) at desired positions.

FIG. 3(E) is a schematic diagram for describing a series of steps in the method for producing a felt-based four-sides-processing material of the present invention and is a schematic perspective view illustrating another example of the felt-based four-sides-processing material products of the second invention, the products obtained by cutting the laminate 30 illustrated in FIG. 3(C) at desired positions.

FIG. 4(A) is a schematic diagram illustrating one example of a pattern of a pressure-sensitive adhesive layer of the pressure-sensitive adhesive layer-forming member 20 to be used in the method for producing a felt-based four-sides-processing material of the present invention.

FIG. 4(B) is a schematic diagram illustrating another example of the pattern of the pressure-sensitive adhesive layer of the pressure-sensitive adhesive layer-forming member 20 to be used in the method for producing a felt-based four-sides-processing material of the present invention. Note that by using the pressure-sensitive adhesive layer-forming member 20 in this example in the lamination step, a felt-based four-sides-processing material 10A of the first invention, having a configuration illustrated in FIG. 1, can be obtained.

FIG. 4(C) is a schematic diagram illustrating still another example of the pattern of the pressure-sensitive adhesive layer of the pressure-sensitive adhesive layer-forming member 20 to be used in the method for producing a felt-based four-sides-processing material of the present invention.

FIG. 5(A) is a schematic diagram for describing an initial state in a series of operations to measure release strength in releasing release paper from a release paper-attached pressure-sensitive adhesive layer that forms a felt-based four-sides-processing material of the present invention and that is provided on a base material.

FIG. 5(B) is a schematic diagram illustrating a state of a felt-based four-sides-processing material of Examples when drawing-up of an attachment 7 attached to the release paper through fixing by adhesion is started from the state in FIG. 5(A).

FIG. 5(C) is a schematic diagram illustrating a state of the felt-based four-sides-processing material of Examples when the release paper begins to be released from the release paper-attached pressure-sensitive adhesive layer provided on the base material by continuing the operation of drawing up the attachment 7 attached to the release paper after starting the operation illustrated in FIG. 5(B).

FIG. 5(D) is a schematic diagram for describing a state of the felt-based four-sides-processing material of Examples when only the release paper is being released from the release paper-attached pressure-sensitive adhesive layer provided on the base material by continuing the operation of drawing up the attachment 7 attached to the release paper subsequently after the operation illustrated in FIG. 5(C).

FIG. 6(A) is a schematic diagram illustrating an initial state of measuring release strength of a felt-based four-sides-processing material of Comparative Example in a series of operations to measure release strength in releasing release paper from a release paper-attached pressure-sensitive adhesive layer provided on a base material in a felt-based four-sides-processing material.

FIG. 6(B) is a schematic diagram illustrating a state of the felt-based four-sides-processing material of Comparative Example when drawing-up of the attachment 7 attached to the release paper through fixing by adhesion is started, which corresponds to the operation illustrated in FIG. 5(B).

FIG. 6(C) is a schematic diagram illustrating a state of the felt-based four-sides-processing material of Comparative Example, the state being such that when the operation of drawing up the attachment 7 attached to the release paper is started and the drawing-up is continued, which corresponds to the operation illustrated in FIG. 5(C), not only the release paper-attached pressure-sensitive adhesive layer provided on the base material but also the base material is peeled.

FIG. 7(A) is a photograph showing a state of a felt-based four-sides-processing material of Example 2 at a stage illustrated in FIG. 5(C) in a series of operations to measure the release strength illustrated in FIG. 5.

FIG. 7(B) is a photograph showing a state of the felt-based four-sides-processing material of Comparative Example at a stage illustrated in FIG. 6(C) in a series of operations to measure the release strength illustrated in FIG. 6.

DESCRIPTION OF EMBODIMENTS

Hereinafter, the present invention will be described in more detail giving preferred embodiments. The present inventors have conducted diligent studies on a release paper-attached pressure-sensitive adhesive layer to be formed on any of flat surfaces of a base material composed of a rectangular column-shaped (plate-shaped) laminate obtained by laminating felt-like rock wool in the thickness direction (any of uppermost or lowermost surfaces of the laminate) to find an effective configuration for solving the technical problem of the present invention and completed the present invention. According to the present invention, when a worker removes the release paper for the purpose of exposing the pressure-sensitive adhesive layer, the worker can smoothly remove the release paper without feeling difficulty and without causing damage to a felt-based four-sides-processing material having a base material composed of a laminate obtained by lamination in the thickness direction, the laminate having an easily peelable structure. As a result, the worker can smoothly start working of four sides processing, and on top of that, can fix the felt-based four-sides-processing material to a desired position of RC, H-steel, or the like sustainably and favorably after completion of working (after construction).

The felt-based four-sides-processing material of the present invention has: a rectangular column-shaped (plate-shaped) base material composed of a flame-retardant, felt-like laminate material, such as rock wool; and a release paper-attached pressure-sensitive adhesive layer on any of flat surfaces of the base material, wherein the pressure-sensitive adhesive layer has a distinctive shape such that at least a non-pressure-sensitive adhesive region is provided in addition to a pressure-sensitive adhesive region. Firstly, each member that forms the felt-based four-sides-processing material of the present invention is described.

(Base Material)

The base material (core material) that forms the felt-based four-sides-processing material of the present invention is a laminate obtained by laminating felt-like rock wool, which is a flame-retardant inorganic material, in the thickness direction, the laminate having a thickness of 3 mm to 50 mm and a width of 5 mm to 10 cm and having a long, rectangular column (plate) shape. Rock wool is an artificial mineral fiber produced by mixing lime or the like with basalt, which is a natural rock, blast furnace slag, which is produced during iron production, or the like; melting the resultant mixture at a high temperature; and processing the molten mixture into the form of fibers. Rock wool contains silicon dioxide (silica) and calcium oxide, as main components, and has a single fiber diameter of about 3 to about 10 μm. Rock wool is widely used as a heat insulating material or a sound absorbing material for buildings and the like. Rock wool also has excellent fire resistance and therefore also used as an alternate material for asbestos.

As described above, the felt-based four-sides-processing material of the present invention is used for filling gaps between peripheral connecting parts (top/bottom and right/left ends) in order to ensure fire resistance and/or sound insulation. Therefore, felt-based four-sides-processing material products are required to have shapes individually adaptable to formed gaps having a great variety of shapes. To satisfy the requirement, infinite kinds of products are needed. On the other hand, from an industrial viewpoint, it is not desirable to increase the types of products too much. Therefore, as a versatile felt-based four-sides-processing material that is highly likely to be adaptable to gaps having a great variety of shapes, there is provided, for example, plural types of products each having a different thickness and thickness, in which the thicknesses and the width are determined in a stepwise manner. Specifically, products each having a different thickness and width are designed, in which the thickness is in a range of 3 mm to 50 mm and the width is in a range of 5 mm to 10 cm.

(Pressure-Sensitive Adhesive Layer)

The felt-based four-sides-processing material of the present invention is such that a release paper-attached pressure-sensitive adhesive layer is formed on any of flat surfaces of a base material (core material) composed of the above-described laminate, wherein the release paper-attached pressure-sensitive adhesive layer has a distinctive shape such that at least a non-pressure-sensitive adhesive region is provided in addition to a pressure-sensitive adhesive region. As will be described later, by making distinctive the shape of the release paper-attached pressure-sensitive adhesive layer, which is used in four sides processing and in which the release paper is laminated in order to protect the pressure-sensitive adhesive surface of the pressure-sensitive adhesive layer, remarkable effects of the present invention are obtained.

FIG. 1 is a perspective view schematically illustrating a felt-based four-sides-processing material of the first invention. As illustrated in FIG. 1, in a felt-based four-sides-processing material 10A of the first invention, a distinctive pressure-sensitive adhesive layer 2 described below is provided in the longitudinal direction on a flat surface on a base material 1. The pressure-sensitive adhesive layer 2 has a continuous pressure-sensitive adhesive region 3 and has a configuration such that this continuous pressure-sensitive adhesive region 3 is provided in a width narrower than that of the base material 1, and a non-pressure-sensitive adhesive region 4 where the pressure-sensitive adhesive is not present is provided along the whole of at least one edge in the longitudinal direction. Specific examples of the pressure-sensitive adhesive layer 2 include a pressure-sensitive adhesive layer having a configuration such that the continuous pressure-sensitive adhesive region 3 is provided in a range of 25% to 99% of the width of the base material 1. Release paper 5 (not shown in FIG. 1; see FIG. 7(A)) pasted to the pressure-sensitive adhesive layer 2 has the same size as the flat surface of the base material 1 on which the pressure-sensitive adhesive layer 2 is provided, which is the same as in conventional products. By configuring the pressure-sensitive adhesive layer and the release paper in these manners, the pressure-sensitive adhesive layer 2 of the felt-based four-sides-processing material 10A of the first invention has the pressure-sensitive adhesive region 3 continuously provided in the longitudinal direction and has a configuration such that the non-pressure-sensitive adhesive region 4 where the pressure-sensitive adhesive is not present is provided linearly for example along the whole of at least one edge in the longitudinal direction of the base material 1 (see FIG. 1). Needless to say, the shape of the non-pressure-sensitive adhesive region 4 is not limited to be linear and may be a shape such that the non-pressure-sensitive adhesive region 4 is formed along the whole of at least one edge in the longitudinal direction of the base material 1, and by configuring the non-pressure-sensitive adhesive region 4 as such, the effects of the present invention can be obtained.

Surprisingly enough, the present inventors have also found that in the above-described configuration, even when the non-pressure-sensitive adhesive region 4 where the pressure-sensitive adhesive is not present, provided along the whole of the edge in the longitudinal direction, is slight in width, that is, accounts for 1% of the width of the short side of the base material 1 (that is, even when the pressure-sensitive adhesive region 3 accounts for 99%), the release strength when the release paper 5 is released from the pressure-sensitive adhesive layer 2 can remarkably be reduced and the release can smoothly be performed as compared to the conventional configuration such that the pressure-sensitive adhesive layer is formed on the whole surface of the base material.

Specifically, according to studies conducted by the present inventors, it has been found that surprisingly enough, the release strength (N/mm) can be reduced to one fifth when a four-sides-processing material having a conventional configuration and the configuration of the pressure-sensitive adhesive layer 2 made into the configuration of the present invention are compared, wherein: the conventional configuration is such that the pressure-sensitive adhesive layer is provided on the whole surface of one flat surface of the base material, and the release paper is correspondingly overlaid and provided on the surface of this pressure-sensitive adhesive layer; and the configuration of the pressure-sensitive adhesive layer 2 is the configuration of the present invention such that the size of the release paper 5 is set as described above, the non-pressure-sensitive adhesive region 4 where the pressure-sensitive adhesive is not present is provided along the whole of the edge in the longitudinal direction of the base material 1, and this non-pressure-sensitive adhesive region 4 is provided in a slight width of about 1% of the width of the short side of the base material 1. Therefore, by only applying simple means of configuring a release paper-attached pressure-sensitive adhesive layer 2 as described above, a worker can smoothly release the release paper 5 from the pressure-sensitive adhesive layer 2 during working of four sides processing.

As illustrated in FIG. 1, in the felt-based four-sides-processing material 10A of the first invention, the non-pressure-sensitive adhesive region 4 where the pressure-sensitive adhesive is not present is provided along the whole of the edge in the longitudinal direction of the base material 1, and therefore even when the felt-based four-sides-processing material 10A is cut according to the place to be constructed to shorten the length as four sides processing is performed, the non-pressure-sensitive adhesive region 4 is provided at the end part without fail, so that the release paper 5 can smoothly be released also in that case.

Even when an embodiment in which the non-pressure-sensitive adhesive region 4 is increased and is provided, for example, widely, up to 75% of the width of the short side of the base material 1, is adopted, in other words, even when a configuration such that the pressure-sensitive adhesive region 3 having the pressure-sensitive adhesive is significantly decreased down to 25% of the width of the base material 1 is adopted, it has been confirmed that the felt-based four-sides-processing material 10A can firmly be fixed without causing floating of the pressure-sensitive adhesive surface of the pressure-sensitive adhesive layer 2 to form a gap between RC, H-steel, or the like and a construction face after construction. The reason for that is considered to be as follows: with regard to the first invention, having the continuous pressure-sensitive adhesive region 3 provided in the longitudinal direction of the base material 1 is essential in the configuration of the pressure-sensitive adhesive layer 2, and therefore the above-described effects can be obtained even when the pressure-sensitive adhesive region 3 is small. Here, making the pressure-sensitive adhesive region 3 having the pressure-sensitive adhesive, to be formed on one flat surface of the base material 1, smaller means that the use amount of the pressure-sensitive adhesive can be reduced and gives a merit of making it possible to reduce pressure-sensitive adhesive material cost.

According to studies conducted by the present inventors, it is preferable to configure the felt-based four-sides-processing material 10A in such a manner as to make a region of, for example, about 50% to about 80% of the width of the short side of the felt-based four-sides-processing material 10A into the pressure-sensitive adhesive region 3 where the pressure-sensitive adhesive is present. By configuring the felt-based four-sides-processing material in this way, the felt-based four-sides-processing material 10A can more firmly be fixed by the pressure-sensitive adhesive layer 2 after construction without forming a gap at a construction face, and the release paper 5 can smoothly be released from the pressure-sensitive adhesive layer 2.

As described above, it is preferable to configure the felt-based four-sides-processing material 10A of the first invention in such a way that the total area of the pressure-sensitive adhesive region 3 having the pressure-sensitive adhesive is within a range of 25% to 99% when the area of the flat surface of the base material 1 on which the pressure-sensitive adhesive layer 2 is provided is assumed to be 100%. More preferably, the felt-based four-sides-processing material 10A of the first invention may be configured in such a way that the pressure-sensitive adhesive region 3 having the pressure-sensitive adhesive is formed within a range of about 50% to about 80%.

Next, a felt-based four-sides-processing material of the second invention will be described. In the felt-based four-sides-processing material of the second invention, a release paper-attached pressure-sensitive adhesive layer having a pressure-sensitive adhesive region provided continuously or discontinuously on any of flat surfaces of the base material in a longitudinal direction of the flat surface is required to be provided. Specifically, the pressure-sensitive adhesive layer has a configuration such that on the flat surface of the base material where the pressure-sensitive adhesive layer is provided, the pressure-sensitive adhesive region having a pressure-sensitive adhesive and a non-pressure-sensitive adhesive region where the pressure-sensitive adhesive is not present are alternately formed along at least one edge in a longitudinal direction of the flat surface, and a non-pressure-sensitive adhesive region where the pressure-sensitive adhesive is not present is provided, in at least one edge part in a short side direction of the base material, at a part including at least one end part of the edge. Also in the second invention, the release paper pasted to the pressure-sensitive adhesive layer has the same size as the flat surface of the base material on which the pressure-sensitive adhesive layer is provided, which is the same as in conventional products.

FIGS. 2(A) to (C) exemplify preferred embodiments of the pressure-sensitive adhesive region 3 and non-pressure-sensitive adhesive region 4 which form the pressure-sensitive adhesive layer 2 of a felt-based four-sides-processing material 10B of the second invention and that are in a state where the laminated release paper has been released. As exemplified in FIGS. 2(A) to (C), the pressure-sensitive adhesive region 3 having the pressure-sensitive adhesive and the non-pressure-sensitive adhesive region 4 where the pressure-sensitive adhesive is not present are alternately formed, as the pressure-sensitive adhesive layer 2, along at least one edge in the longitudinal direction of the base material 1 in any of these examples. In examples illustrated in FIGS. 2(B) and (C), the pressure-sensitive adhesive region 3 and the non-pressure-sensitive adhesive region 4 are alternately formed along both edges in the longitudinal direction of the base material 1. In examples illustrated in FIGS. 2(A) and (B), the continuous pressure-sensitive adhesive region 3 is provided in the longitudinal direction of the base material 1, which is the same as in the case of the first invention, in addition to what is described above. In addition, as exemplified in FIGS. 2(A) to (C), it is required that in the felt-based four-sides-processing material 10B of the second invention, the non-pressure-sensitive adhesive region 4 where the pressure-sensitive adhesive is not present be provided, in at least one edge part in the short side direction of the base material 1, at a part including at least one end part of the edge.

As exemplified in FIGS. 2(A) to (C), in the felt-based four-sides-processing material 10B of the second invention, the non-pressure-sensitive adhesive region 4 where the pressure-sensitive adhesive is not present is formed without fail along at least one edge in the longitudinal direction of the base material 1. Therefore, even when the felt-based four-sides-processing material 10B of the second invention, as well as the four-sides-processing material 10A of the first invention, is cut according to the place to be constructed to shorten the length of the material as four sides processing is performed, the non-pressure-sensitive adhesive region 4 is provided at the end part of at least one edge in the longitudinal direction without fail, so that a worker can smoothly release the release paper 5 (see FIG. 7(A)) pasted to the pressure-sensitive adhesive layer 2 also in the case of the shortened material.

In addition, in examples illustrated in FIGS. 2(A) and (B), the pressure-sensitive adhesive layer 2 that forms the second invention has the pressure-sensitive adhesive region 3 continuously provided in the longitudinal direction of the base material 1, which is the same as in the four-sides-processing material 10A of the first invention. Therefore, the felt-based four-sides-processing material 10B, as well as the four-sides-processing material 10A of the first invention, is firmly fixed without causing floating of the pressure-sensitive adhesive surface of the pressure-sensitive adhesive that forms the pressure-sensitive adhesive region 3 to form a gap between RC, H-steel, or the like and a construction face after construction.

Also in the felt-based four-sides-processing material 10B of the second invention, it is preferable to configure the pressure-sensitive adhesive layer 2 which is formed on the flat surface of the base material 1 in such a way that the total area of the pressure-sensitive adhesive region 3 having the pressure-sensitive adhesive is within a range of 25% to 99% when the area of the flat surface of the base material 1 on which the pressure-sensitive adhesive layer 2 is provided is assumed to be 100%. More preferably, the pressure-sensitive adhesive layer 2 may be configured in such a way that the pressure-sensitive adhesive region 3 having the pressure-sensitive adhesive is formed within a range of about 50% to about 80%.

As described above, the difference between the felt-based four-sides-processing materials of the first invention and the second invention is in the form of the non-pressure-sensitive adhesive region 4 where the pressure-sensitive adhesive is not present in the pressure-sensitive adhesive layer 2 formed on the flat surface of the base material 1. The characteristic of the second invention is in that the second invention has a configuration such that the pressure-sensitive adhesive region 3 having the pressure-sensitive adhesive and the non-pressure-sensitive adhesive region 4 where the pressure-sensitive adhesive is not present are alternately formed along at least one edge in the longitudinal direction of the base material 1. Considering the convenience in releasing the release paper 5 (see FIG. 7(A)) from the edge part in the short side direction of the base material 1 in the felt-based four-sides-processing material 10B of the second invention, the non-pressure-sensitive adhesive region 4 where the pressure-sensitive adhesive is not present needs to be provided along a part including at least one end part in at least one edge in the short side direction of the base material 1. Note that the pressure-sensitive adhesive layer 2 in the felt-based four-sides-processing material 10A of the first invention satisfies a configuration in terms of this point, and therefore such a configuration needs not to be specified once more.

(Release Paper)

The felt-based four-sides-processing material of the present invention further has the release paper 5 which is pasted to the pressure-sensitive adhesive layer 2 having a configuration having the above-described pressure-sensitive adhesive region 3 and non-pressure-sensitive adhesive region 4. In both of the above-described felt-based four-sides-processing materials 10A and 10B of the first invention and the second invention, the release paper 5 has the same size as the size of the flat surface of the base material 1 on which the pressure-sensitive adhesive layer 2 is provided. The shape and material of the release paper 5 are not different from those of release paper which has conventionally been used. Specifically, for example, release paper obtained by coating a surface of paper with a release agent, such as a silicone resin, can appropriately be used. Specific examples of the release paper which is used in the present invention include known release paper which is used for so-called double-sided tape products, and such release paper can appropriately be used.

In the present invention, by configuring the pressure-sensitive adhesive layer 2 having the pressure-sensitive adhesive region 3 which is provided on the flat surface of the base material 1 and which is formed with the pressure-sensitive adhesive into one having the non-pressure-sensitive adhesive region 4 as described above, the remarkable effects of the present invention are obtained. According to studies conducted by the present inventors, some of the effects of the present invention can also be obtained not only from such a configuration but also by configuring the pressure-sensitive adhesive layer 2 as described below. Specifically, when a pressure-sensitive adhesive region having a pressure-sensitive adhesive is provided on the whole surface of a flat surface of the base material on which the pressure-sensitive adhesive layer is to be provided, the release paper can also smoothly be released by making the release paper to be pasted to the pressure-sensitive adhesive region into one having a width larger than the width of the flat surface of the base material. That is, as described above, by making the release paper into one having a width slightly larger than the width of the pressure-sensitive adhesive layer having a configuration such that the pressure-sensitive adhesive region is provided on the whole surface of the flat surface of the base material, the release strength in releasing the release paper pasted to the pressure-sensitive adhesive layer provided on the base material from the pressure-sensitive adhesive layer can be reduced. According to studies conducted by the present inventors, by increasing the width of the release paper to, for example, 101 assuming that the width of the pressure-sensitive adhesive layer to be 100, the release strength can be reduced to about one fourth.

However, when the above-described configuration is adopted, a plurality of the felt-based four-sides-processing materials cannot be produced efficiently by a simple method as described below. Specifically, when an attempt is made to obtain felt-based four-sides-processing material products having the above-described configuration by a method of obtaining a plurality of long, rectangular column-shaped (plate-shaped) products having a width of 5 mm to 10 cm, in which a wide felt-based four-sides-processing material (a laminate for production) is prepared and then cut into stripe shapes in a cutting step, a large number of products cannot be obtained, and therefore there is a problem that such felt-based four-sides-processing material products are inferior in production efficiency.

Hereinafter, a method for producing a felt-based four-sides-processing material of the present invention will be described with reference to FIGS. 3(A) to (E). A felt-based four-sides-processing material exemplified in FIGS. 3(A) to (E) is for producing the felt-based four-sides-processing material 10B having the release paper 5-attached pressure-sensitive adhesive layer 2 specified in the second invention of the present invention. FIG. 3(A) is a schematic diagram of one example of a pressure-sensitive adhesive layer-forming member 20 for production to be used in production. In the example illustrated in the figures, the pressure-sensitive adhesive layer-forming member 20, in which a pressure-sensitive adhesive layer 22 having a lattice-like pressure-sensitive adhesive pattern having a pressure-sensitive adhesive region 33 and a non-pressure-sensitive adhesive region 44 is formed on a surface of release paper 55, as illustrated in FIG. 3(A), is used. Note that the release paper 55 has the same size as the pressure-sensitive adhesive layer 22, and the two are laminated and integrated, but illustrated in the figures as reference numeral 55 for description.

Next, as illustrated in FIG. 3(B), the pressure-sensitive adhesive layer-forming member 20 is pasted and laminated onto the flat surface of the base material 11 for production in a lamination step. As the base material 11 for production, a laminate obtained by laminating felt-like rock wool in a thickness direction, the laminate having a thickness of 3 mm to 50 mm and being such that a flat surface shape is a square or rectangle in which each length of two sides is independently 50 cm or longer is used. Onto any of flat surfaces of this wide base material 11 for production, the pressure-sensitive adhesive layer-forming member 20 for production having a flat surface whose size is the same as the flat surface of the base material 11 for production is pasted and laminated, and thereby a laminate 30 for production having a configuration illustrated in FIG. 3(C) can be obtained. The laminate 30 has a structure such that the pressure-sensitive adhesive layer-forming member 20 is laminated on the base material 11 for production, and the pressure-sensitive adhesive layer 22 for production, making it possible to form the pressure-sensitive adhesive layer 2 that characterizes the present invention, and the release paper 55 for production, pasted to the surface of the pressure-sensitive adhesive region 33 of the pressure-sensitive adhesive layer 22, are laminated in the mentioned order.

Next, the laminate 30 for production, obtained above, is cut in the cutting step, and thereby the felt-based four-sides-processing material products of the present invention, which are a plurality of long, rectangular column-shaped (plate-shaped) products whose widths are adjusted to 5 mm to 10 cm, can simply be obtained. Specifically, when the laminate 30 is, for example, a laminate obtained by laminating the pressure-sensitive adhesive layer-forming member 20 having the pressure-sensitive adhesive region 33 having a pattern as illustrated in FIG. 4(A), felt-based four-sides-processing material products 10B having the pressure-sensitive adhesive layer 2 having the configuration of the second invention, as illustrated in FIGS. 3(D) and (E), can easily be obtained by cutting the laminate at desired positions as shown by broken lines in FIG. 3(C). Further, when the laminate 30 is, for example, a laminate obtained by laminating the pressure-sensitive adhesive layer-forming member 20 having the pressure-sensitive adhesive region 33 having a pattern as illustrated in FIG. 4(B), felt-based four-sides-processing material products 10A having the pressure-sensitive adhesive layer 2 having the configuration of the first invention, as illustrated in FIG. 1, can easily be obtained by cutting the laminate at desired positions as shown by broken lines in FIG. 3(C). Any of the obtained felt-based four-sides-processing material products 10A or 10B is such that a worker during construction can easily release the release paper 5 laminated on and integrated with the pressure-sensitive adhesive layer 2.

The pressure-sensitive adhesive layer-forming member 20, which is used in obtaining the above-described laminate 30 for production, is preferably produced utilizing any of so-called double-sided tapes given below. By using a double-sided tape having a configuration of, for example, any of the configurations as described below, the pressure-sensitive adhesive layer-forming member 20 can easily be produced. Double-sided tapes include one having a base material having a structure such that a pressure-sensitive adhesive is laminated on both sides of a support (base material) and one composed of only a pressure-sensitive adhesive without having a support, so-called base material-less double-sided tape. As the support (base material), non-woven fabric, a resin film such as PET, cloth, Japanese paper, or the like is used. In the present invention, any of these double-sided tapes having configurations having a support (base material) and base material-less double-sided tapes can be used. The important thing in the present invention is in that with regard to the pressure-sensitive adhesive layer 22 that forms the pressure-sensitive adhesive layer-forming member 20 for production, when the felt-based four-sides-processing materials of the present invention are produced by cutting the laminate 30 into particular widths in the cutting step, the pressure-sensitive adhesive layer 2 of the obtained products are formed in such a way as to have a distinctive shape as described above and specified in the present invention. Thus, as described above, in the felt-based four-sides-processing material of the present invention, produced by cutting the laminate 30 in which the pressure-sensitive adhesive layer-forming member 20 having the above-described configuration is laminated, the release paper 5 pasted to and integrated with the pressure-sensitive adhesive layer 2 can easily be released (see FIG. 1, FIG. 3(D), and FIG. 3(E)).

That is, according to the method for producing a felt-based four-sides-processing material of the present invention, products can efficiently be produced by a series of the steps described below, wherein the products are such that: the pressure-sensitive adhesive layer 2 having a distinctive configuration is laminated on one surface of the base material obtained by laminating felt-like rock wool in the thickness direction, the base material having a thickness of 3 mm to 50 mm and a width of 5 mm to 10 cm; and the release paper 5 having the same size as the size of the base material 1 is pasted to and integrated with the pressure-sensitive adhesive layer 2.

Firstly, the pressure-sensitive adhesive layer-forming member 20 for production having, for example, a configuration as illustrated in FIG. 3(A) and having flat surface whose size is the same as the size of the base material 11 for production which will be described later is prepared. In the lamination step of pasting the pressure-sensitive adhesive layer 22 and the release paper 55 that form this pressure-sensitive adhesive layer-forming member 20 to the base material 11 for production, a double-sided tape having, for example, a configuration described below is preferably used. Specifically, it is required to use a wide double-sided tape having a structure such that: the pressure-sensitive adhesive layer for production is formed on both surfaces of a film support (not shown in the figures); the pattern of the pressure-sensitive adhesive region 33 of at least one pressure-sensitive adhesive layer 22 of these pressure-sensitive adhesive layers is configured so that the non-pressure-sensitive adhesive region 44 specified in the present invention can be formed; and the release paper 55 for production is laminated on this pressure-sensitive adhesive layer 22. Note that in this case, the configuration of the pressure-sensitive adhesive layer on the side where the pressure-sensitive adhesive layer-forming member 20 is pasted to the base material 11 for production is not particularly limited, and, for example, the whole surface may be configured by a pressure-sensitive adhesive region having the pressure-sensitive adhesive. Needless to say, a pressure-sensitive adhesive layer having a configuration such that the pressure-sensitive adhesive layer 22 having the pressure-sensitive adhesive region 33 having a pattern specified in the present invention is formed on both sides of the film support of the double-sided tape can also suitably be used.

Next, as illustrated in FIG. 3(B), in the lamination step, the surface of the pressure-sensitive adhesive layer 22 on the side of the pressure-sensitive adhesive layers 22 that form the pressure-sensitive adhesive layer-forming member 20, where the release paper 55 is not laminated, is pasted to one flat surface of the base material 11 for production to obtain the laminate 30 for production. As a result, the laminate 30 such that on the flat surface of the base material 11 for production, made of rock wool, the pressure-sensitive adhesive layer 22 for production and the release paper 55 for production, both of which have the same size as the size of the flat surface, are laminated can easily be obtained. As the base material 11, the base material 11 for production, made of rock wool being a laminate obtained by laminating felt-like rock wool in a thickness direction, the laminate having a thickness of 3 mm to 50 mm and being such that a flat surface shape thereof is a square or rectangle in which each length of two sides is independently 50 cm or longer, is used. Note that description is made above for a case where a double-sided tape having a configuration such that the pressure-sensitive adhesive layer 22 for production is formed on both sides of the film support, but the production method of the present invention is not limited to this, and a base material-less double-sided tape as described above can also be used.

By using a pressure-sensitive adhesive layer-forming member having a configuration described below as the pressure-sensitive adhesive layer-forming member 20 in the lamination step, the felt-based four-sides-processing material 10A or 10B, with which the effects of the present invention can be obtained, can simply be obtained. With regard to the pressure-sensitive adhesive layer-forming member 20 for production, it is required that: the pressure-sensitive adhesive layer-forming member 20 for production have a flat surface shape which is the same as the shape of the surface of the base material 11 for production where the pressure-sensitive adhesive layer 22 is to be provided; and the shape of the release paper-attached pressure-sensitive adhesive layer after cutting, in the cutting step, the laminate 30 obtained by laminating the pressure-sensitive adhesive layer-forming member 20 on the base material 11 for production have a configuration described below. Specifically, the pressure-sensitive adhesive layer 22 for production is required to have a configuration such that the products after cutting have a shape for forming the non-pressure-sensitive adhesive region 4 where the pressure-sensitive adhesive is not present along at least one edge in the longitudinal direction of the base material 1 made of rock wool, as illustrated in FIG. 1. Alternatively, the pressure-sensitive adhesive layer 22 for production is required to have a configuration such that: the products after cutting have a configuration of alternately forming the pressure-sensitive adhesive region 3 having the pressure-sensitive adhesive and the non-pressure-sensitive adhesive region 4 where the pressure-sensitive adhesive is not present, as illustrated in FIG. 3(D) or 3(E); the pressure-sensitive adhesive layer 22 have a distinctive shape such that the products after cutting have a configuration of providing the non-pressure-sensitive adhesive region 4 where the pressure-sensitive adhesive is not present, in at least one edge part in the short side direction of the base material 1 made of rock wool, at a part including at least one end part of the edge.

FIGS. 4(A) to (C) each exemplify a pattern that is formed on the pressure-sensitive adhesive layer-forming member 20 for production, that forms the pressure-sensitive adhesive layer 22, and that is formed by the pressure-sensitive adhesive region 33 and the non-pressure-sensitive adhesive region 44. For example, by applying the pattern illustrated in FIG. 4(A) or FIG. 4(C) to the above-described production method, the felt-based four-sides-processing material 10B of the second invention can simply be obtained. By applying the pattern illustrated in FIG. 4(B) to the above-described production method, the felt-based four-sides-processing material 10A of the first invention can simply be obtained. However, the present invention is not limited to these patterns.

By just using the pressure-sensitive adhesive layer-forming member 20 for production having a configuration as described above and having a release paper-attached pressure-sensitive adhesive layer and pasting it to the base material 11 for production, the laminate 30 for production can be obtained, wherein the laminate 30 makes it possible to form the release paper-attached pressure-sensitive adhesive layer 2 having a distinctive shape specified in the present invention. Then, by cutting the wide laminate 30, which is obtained in the manner as described above and in which the release paper 55-attached pressure-sensitive adhesive layer 22 is laminated and provided on one flat surface of the base material 11 for production, into appropriate widths as illustrated in FIG. 3(C) in the subsequent cutting step, the felt-based four-sides-processing material of the present invention can simply be obtained. When the laminate 30 is, for example, one obtained by laminating the pressure-sensitive adhesive layer-forming member 20 having the pressure-sensitive adhesive region 33 having the pattern illustrated in FIG. 4(B), the felt-based four-sides-processing material 10A, which is as illustrated in FIG. 1 and in which the pressure-sensitive adhesive layer 2 having a distinctive configuration specified in the first invention, can simply be obtained.

Further, for example, the felt-based four-sides-processing materials 10B, which are as illustrated in FIGS. 2(A) and (B) and in which the pressure-sensitive adhesive layer 2 having a distinctive configuration specified in the second invention, can simply be obtained. More specifically, when the laminate 30 is, for example, one obtained by laminating the pressure-sensitive adhesive layer-forming member 20 having the pressure-sensitive adhesive region 33 having the pattern illustrated in FIG. 4(A), the felt-based four-sides-processing material illustrated in FIG. 3(D) can be obtained by cutting the laminate 30 along line segment D-D in FIG. 3(C). Furthermore, the felt-based four-sides-processing material illustrated in FIG. 3(E) can be obtained by cutting the laminate 30 along line segment E-E and line segment E'-E'.

EXAMPLES

Hereinafter, the present invention will specifically be described based on Examples and Comparative Example, but the present invention is not limited to these Examples.

Felt-based four-sides-processing materials each having a different pressure-sensitive adhesive layer configuration were obtained by the production method including procedures as illustrated in FIGS. 3(A) to (C) and used as samples for evaluation of Examples and Comparative Example. Specifically, a laminate made of rock wool (manufactured by MARUSAN PAPER MFG. CO., LTD.) having a thickness of 10 mm, a width of 40 mm, and a length of 200 mm was used as the base material 1, and three felt-based four-sides-processing materials were prepared in total as the samples for evaluation; two for Examples and one for Comparative Example, each having a different shape (in terms of area and pattern of pressure-sensitive adhesive) of the pressure-sensitive adhesive region 3 of the pressure-sensitive adhesive layer 2 formed on one flat surface of this base material 1.

When the release paper 5-attached pressure-sensitive adhesive layer 2 was formed in producing the above-described samples for evaluation, a so-called double-sided tape such that the pressure-sensitive adhesive layer 22 was provided on both surfaces of a film support and a surface of one of the pressure-sensitive adhesive layers 22 was protected by the release paper 55 was used as the pressure-sensitive adhesive layer-forming member 20 having the release paper 55-attached pressure-sensitive adhesive layer 22. The pressure-sensitive adhesive layer 22 of each pressure-sensitive adhesive layer-forming member 20 on the side not protected by the release paper 55 was pasted to one flat surface of the base material 11 prepared above, and the resultant laminate was cut into 40 mm width to obtain each of the felt-based four-sides-processing material of Examples and Comparative Example. On each pressure-sensitive adhesive layer 22 of the used double-sided tape on the side protected by the release paper 55, the pressure-sensitive adhesive region 33 having a different pressure-sensitive adhesive pattern was provided.

Specifically, in any of Examples and Comparative Example, a pressure-sensitive adhesive layer-forming member (double-sided tape) such that a pressure-sensitive adhesive layer is provided on one surface of release paper whose size is the same as the size of the base material prepared above and one pressure-sensitive adhesive surface of the pressure-sensitive adhesive layer is protected by the release paper was used to form pressure-sensitive adhesive layers whose areas of the pressure-sensitive adhesive region having the pressure-sensitive adhesive are different from each other on one flat surface of the base material.

That is, each of pressure-sensitive adhesive layers that form the four-sides-processing materials of Examples 1 and 2 is one such that the non-pressure-sensitive adhesive region 4 where the pressure-sensitive adhesive is not present is provided along the whole of one edge in the longitudinal direction, as illustrated in FIG. 1, and when the area of the flat surface of the base material 1 is assumed to be 100%, the total area of the pressure-sensitive adhesive region 3 having the pressure-sensitive adhesive was set to 99% (the non-pressure-sensitive adhesive region was set to 1%) in Example 1 and 80% (the non-pressure-sensitive adhesive region was set to 20%) in Example 2. On the other hand, in the felt-based four-sides-processing material of Comparative Example, when the area of the flat surface of the base material is assumed to be 100%, the total area of the pressure-sensitive adhesive region that forms a pressure-sensitive adhesive layer 2' (see FIG. 7(B)) is also 100%, and therefore the two are the same, that is, the felt-based four-sides-processing material of Comparative Example has the same configuration as that of conventional products having a configuration not having a non-pressure-sensitive adhesive region. An acrylic pressure-sensitive adhesive was used for forming the pressure-sensitive adhesive layer, and release paper obtained by coating the surface of woodfree paper with a silicone resin was used as the release paper.

For each of the felt-based four-sides-processing materials of Examples and Comparative Example, in which the total area of the pressure-sensitive adhesive region of the above-described pressure-sensitive adhesive layer is different from each other, a release test of removing the release paper to expose the pressure-sensitive adhesive layer was conducted in the manner as illustrated FIGS. 5(A) to (D) and FIGS. 6(A) to (C), and thereby easiness of releasing the release paper during performing release operation and an influence on the base material during releasing were checked. The release test was conducted in the manner as described below. Firstly, an attachment 7, which is a testing tool for removing the release paper 5, was attached to the release paper 5 at the end part of the felt-based four-sides-processing material to be an object of the test by bonding and fixing using an epoxy-based pressure-sensitive adhesive so that the attachment 7 would not be peeled. Then, the testing tool was drawn up at a constant speed of 1 mm/minute to check the situation regarding how the release paper 5 laminated on the pressure-sensitive adhesive layer 2 or 2' was released.

Table 1 shows evaluation results for each of the felt-based four-sides-processing materials of Examples 1 and 2 and Comparative Example. For reference, release strength was determined for Examples 1 and 2 and Comparative Example from differences in resistance strength during the drawing-up, and the values thereof are also described in Table 1. In addition, FIG. 7(A) and FIG. 7(B) show a difference in the released state of the release paper after the release test between Example 2 and Comparative Example. As can be seen from Table 1, the results of the above-described release tests demonstrated that the release strength for the felt-based four-sides-processing material 10C of Comparative Example was larger than the release strength of each of the felt-based four-sides-processing materials of Examples 1 and 2. Further, as shown in FIG. 7(A), in the case of the felt-based four-sides-processing material 10A of Example 2, only the release paper 5 was neatly released without giving any influence on the base material 1. In contrast, as shown in FIG. 7(B), in the case of the felt-based four-sides-processing material 10C of Comparative Example, in which the non-pressure-sensitive adhesive region is not provided at the end part, the release paper 5 was not released easily from the pressure-sensitive adhesive layer 2', which was different from the Example 2 as shown in FIG. 7(A), and when the release paper 5 was forcibly released, the pressure-sensitive adhesive layer 2' and a part of the base material 1, which is a laminate obtained by laminating the pressure-sensitive adhesive layer 2' in the thickness direction, were peeled together, and the felt-based four-sides-processing material 10C was turned into a broken state. In this state, the felt-based four-sides-processing material cannot be used favorably. Therefore, to avoid occurrence of such a state, a worker needs to release the release paper cautiously and prudently in the case of the felt-based four-sides-processing material 10C having a configuration of Comparative Example.

That is, from the results of the release test, it was confirmed that providing the non-pressure-sensitive adhesive region 4 where the pressure-sensitive adhesive is not present along one edge in the longitudinal direction of the pressure-sensitive adhesive layer 2 provided in the surface of the base material 1, as in Examples 1 and 2, made it possible to release the release paper 5 easily from the pressure-sensitive adhesive layer 2. This means that according to the present invention, an improvement in working efficiency during working can be realized by simple means, and on top of that, an increase in material cost caused by breakage of felt-based four-sides-processing materials can be suppressed.

TABLE 1

Configuration of felt-based four-sides-processing material and release strength of release paper

|  |  | Example 1 | Example 2 | Comparative Example |
|---|---|---|---|---|
| *1 | Area of surface of base material where pressure-sensitive adhesive layer is present | 100 | 100 | 100 |
|  | Total area of pressure-sensitive adhesive region of pressure-sensitive adhesive layer | 99 | 80 | 100 |
|  | Pattern of pressure-sensitive adhesive region | FIG. 1 | FIG. 1 | Whole surface |
|  | Area of laminated release paper | 100 | 100 | 100 |
| *2 | Release strength (N/mm) | 0.030 | 0.013 | 0.15 |
|  | Ratio of release strength to that in Comparative Example | 5.00 | 11.54 | — |
|  | (Strength in Example/Strength in Comparative Example) | (0.2) | (0.087) |  |
| *3 | Easiness of release | Good | Excellent | Poor |
|  | Breakage of base material | Good | Excellent | Poor |
|  | Comprehensive evaluation | Good | Excellent | Poor |

*1: Configuration of processing material
*2: Release performance
*3: Evaluation results As for the evaluation results in Table 1, evaluations were performed according to the following criteria.

(1) Easiness of Release

Easiness of release was evaluated according to the following criteria considering a value of a ratio of release strength to that in Comparative Example (release strength in Example/release strength in Comparative Example) and feeling when the release paper was released.

Excellent: The value of the ratio is less than 0.1. The release paper is released extremely smoothly.

Good: The value of the ratio is 0.1 or more and 0.2 or less. The release paper is more easily released than the material of Comparative Example.

Poor: The value of the ratio is more than 0.2. The release paper is hard to release, which is similar to the material of Comparative Example.

(2) Breakage of Base Material

Excellent: Peeling was not observed at all in the laminate as the base material.

Good: Slight peeling was observed in the laminate as the base material, but there is no problem in practical use.

Poor: Peeling is clearly observed in the laminate as the base material.

A felt-based four-sides-processing material as illustrated in FIG. 3(E) was obtained in the same manner as described above using the same materials as those described above, wherein the felt-based four-sides-processing material was such that the total area of the pressure-sensitive adhesive region 3 was 80% (the area of the non-pressure-sensitive adhesive region was 20%), and the pressure-sensitive adhesive layer 2 has a pattern having the pressure-sensitive adhesive region 3 and the non-pressure-sensitive adhesive region 4 alternately formed along the one edge in the longitudinal direction. Then, the felt-based four-sides-processing material obtained was evaluated by the same method as described above. The result was the same as that for the felt-based four-sides-processing material of Example 2: the release paper 5 was released extremely smoothly; and peeling was not observed at all in the laminate as the base material 1.

REFERENCE SIGNS LIST

1 Base material
2 Pressure-sensitive adhesive layer
3 Pressure-sensitive adhesive region
4 Non-pressure-sensitive adhesive region
5 Release paper
7 Attachment
11 Base material for production
22 Pressure-sensitive adhesive layer for production
33 Pressure-sensitive adhesive region for production
44 Non-pressure-sensitive adhesive region for production
55 Release paper for production
10A Felt-based four-sides-processing material of first invention
10B Felt-based four-sides-processing material of second invention
10C Felt-based four-sides-processing material of Comparative Example
20 Pressure-sensitive adhesive layer-forming member
30 Laminate

The invention claimed is:

1. A felt-based four-sides-processing material having a release paper-attached pressure-sensitive adhesive layer, the felt-based four-sides-processing material comprising:
   a rectangular column-shaped base material comprising a flame-retardant felt material;
   a pressure-sensitive adhesive layer having a pressure-sensitive adhesive region provided continuously or discontinuously on one of flat surfaces of the base material in a longitudinal direction of the flat surface; and
   release paper pasted to the pressure-sensitive adhesive layer, wherein
   the base material is a laminate obtained by laminating felt rock wool in a thickness direction, the resulting felt laminate having a thickness in a range from 3 mm to 50 mm and a width in a range from 5 mm to 10 cm and having a rectangular column shape;
   the pressure-sensitive adhesive layer has a configuration such that on the flat surface of the base material directly on which the pressure-sensitive adhesive layer is provided, the pressure-sensitive adhesive region having a pressure-sensitive adhesive and a non-pressure-sensitive adhesive region where the pressure-sensitive adhesive is not present are alternately formed along at least one edge in a longitudinal direction of the flat surface, and a non-pressure-sensitive adhesive region where the pressure-sensitive adhesive is not present is provided, in at least one edge part in a short side direction of the base material, at a part including at least one end part of the edge; and
   the release paper has a size equal to a size of the flat surface of the base material.

2. The felt-based four-sides-processing material according to claim 1,
   wherein the pressure-sensitive adhesive layer has a structure such that pressure-sensitive adhesive layers are formed on both sides of a film support, and at least the pressure-sensitive adhesive layer on the side where the release paper is pasted has a configuration having the non-pressure-sensitive adhesive region where the pressure-sensitive adhesive is not present along at least one edge in the longitudinal direction of the base material or has a configuration alternately having the pressure-sensitive adhesive region having the pressure-sensitive adhesive and the non-pressure-sensitive adhesive region where the pressure-sensitive adhesive is not present along at least one edge in the longitudinal direction of the base material.

3. The felt-based four-sides-processing material according to claim 1, wherein in the pressure-sensitive adhesive layer, the pressure-sensitive adhesive region has a total area in a range from 25% to 99% relative to a total area of the flat surface of the base material where the pressure-sensitive adhesive layer as 100%.

4. A method for producing the felt-based four-sides-processing material according to claim 1, the method comprising:
   laminating a pressure-sensitive adhesive layer-forming member directly on one of the flat surfaces of the base material made of rock wool so as to form the pressure-sensitive adhesive layer-forming member comprising the pressure-sensitive adhesive layer and a release paper on a surface of the pressure-sensitive adhesive layer at an opposite side to a side facing the base material, thereby a laminate of the base material, the pressure-sensitive adhesive layer, and the release paper in this order being obtained, wherein the base material is the felt laminate obtained by laminating the felt rock wool in the thickness direction of the base material, the felt laminate is configured such that the thickness is in the range from 3 mm to 5 mm, and a shape of the flat surface is a square or rectangle in which each length of two sides of the flat surface of the base material is independently in the range of 50 cm or longer; and cutting the laminate obtained in the laminating in the longitudinal direction, thereby obtaining the rectangular column-shaped, felt-based four-sides-processing material having the width adjusted to in the range from 5 mm to 10 cm, wherein the pressure-sensitive adhesive layer-forming member has a shape of a flat surface equal to a shape of the flat surface of the base material directly on which the pressure-sensitive adhesive layer is to be provided, the pressure-sensitive adhesive layer-forming member has Configuration (B)

in which the shape of the release paper-attached pressure-sensitive adhesive layer as the pressure-sensitive adhesive layer-forming member, after being cut in the cutting is such that the pressure-sensitive adhesive region and the non-pressure-sensitive adhesive region are alternately formed along at least one edge in the longitudinal direction of the base material; and the non-pressure-sensitive adhesive region is formed in the at least one edge part in the short side direction of the base material, at the part including the at least one end part of the edge.

5. A felt-based four-sides-processing material having a release paper-attached pressure-sensitive adhesive layer, the felt-based four-sides-processing material comprising:
 a rectangular column-shaped base material comprising a flame-retardant felt material;
 a pressure-sensitive adhesive layer having a continuous pressure-sensitive adhesive region provided on one of flat surfaces of the base material in a longitudinal direction of the flat surface; and
 release paper pasted to the pressure-sensitive adhesive layer, wherein
 the base material is a laminate obtained by laminating felt rock wool in a thickness direction, the resulting felt laminate having a thickness in a range from 3 mm to 50 mm and a width in a range from 5 mm to 10 cm and having a rectangular column shape;
 the pressure-sensitive adhesive layer has a configuration such that the continuous pressure-sensitive adhesive region having a pressure-sensitive adhesive is provided directly on the flat surface of the base material where the pressure-sensitive adhesive layer is provided in a width narrower than a width of a short side of the base material, and a non-pressure-sensitive adhesive region where the pressure-sensitive adhesive is not present is provided along whole of at least one edge in the longitudinal direction; and
 the release paper has a size equal to a size of the flat surface of the base material.

6. The felt-based four-sides-processing material according to claim 5, wherein the pressure-sensitive adhesive layer has a structure such that pressure-sensitive adhesive layers are formed on both sides of a film support, and at least the pressure-sensitive adhesive layer on the side where the release paper is pasted has a configuration having the non-pressure-sensitive adhesive region where the pressure-sensitive adhesive is not present along at least one edge in the longitudinal direction of the base material or has a configuration alternately having the pressure-sensitive adhesive region having the pressure-sensitive adhesive and the non-pressure-sensitive adhesive region where the pressure-sensitive adhesive is not present along at least one edge in the longitudinal direction of the base material.

7. The felt-based four-sides-processing material according to claim 5, wherein in the pressure-sensitive adhesive layer, the pressure-sensitive adhesive region has a total area in a range from 25% to 99% when a total area of the flat surface of the base material where the pressure-sensitive adhesive layer is provided as 100%.

8. A method for producing the felt-based four-sides-processing material according to claim 1, the method comprising:
 laminating a pressure-sensitive adhesive layer-forming member directly on one of the flat surfaces of the base material made of rock wool so as to form the pressure-sensitive adhesive layer-forming member comprising the pressure-sensitive adhesive layer and the release paper on a surface of the pressure-sensitive adhesive layer at an opposite side to a side facing the base material, thereby a laminate of the base material, the pressure-sensitive adhesive layer, and the release paper in this order being obtained,
 wherein the base material is the felt laminate obtained by laminating the felt rock wool in the thickness direction of the base material,
 the felt laminate is configured such that the thickness is in the range from 3 mm to 5 mm, and a shape of the flat surface is a square or rectangle in which each length of two sides of the flat surface of the base material is independently in the range of 50 cm or longer; and
 cutting the laminate obtained in the laminating in the longitudinal direction thereof, thereby obtaining the rectangular column-shaped, felt-based four-sides-processing material having the width adjusted to be in the range from 5 mm to 10 cm,
 wherein the pressure-sensitive adhesive layer-forming member has a shape of a flat surface equal to a shape of the flat surface of the base material directly on which the pressure-sensitive adhesive layer is to be provided,
 the pressure-sensitive adhesive layer-forming member has Configuration (A) in which a shape of the release paper-attached pressure-sensitive adhesive layer after being cut in the cutting is such that a non-pressure-sensitive adhesive region where the pressure-sensitive adhesive is not present is formed along at least one edge in a longitudinal direction of the base material.

* * * * *